US008332497B1

(12) United States Patent
Gladish et al.

(10) Patent No.: US 8,332,497 B1
(45) Date of Patent: Dec. 11, 2012

(54) GENERIC RESYNCHRONIZATION BETWEEN PERSISTENT MANAGEMENT STORE AND DYNAMIC CONFIGURATION

(75) Inventors: Jacob Gladish, Sunnyvale, CA (US); Ronald W. Kownacki, Pittsburgh, PA (US); Michael Comer, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1097 days.

(21) Appl. No.: 11/676,894

(22) Filed: Feb. 20, 2007

(51) Int. Cl.
*G06F 15/173* (2006.01)
*G06F 15/16* (2006.01)

(52) U.S. Cl. ........ 709/223; 709/217; 709/218; 707/610; 707/613; 707/614

(58) Field of Classification Search .................. 709/221, 709/201, 203, 217, 218, 223, 248; 707/610–614, 707/617
See application file for complete search history.

(56) References Cited

U.S. PATENT DOCUMENTS

| | | | | |
|---|---|---|---|---|
| 5,483,526 | A * | 1/1996 | Ben-Nun et al. | 370/395.7 |
| 6,233,606 | B1 * | 5/2001 | Dujari | 709/213 |
| 6,247,055 | B1 * | 6/2001 | Cotner et al. | 709/227 |
| 6,330,600 | B1 * | 12/2001 | Matchefts et al. | 709/223 |
| 6,671,773 | B2 | 12/2003 | Kazar | |
| 6,820,085 | B2 * | 11/2004 | Nishizawa et al. | 1/1 |
| 7,062,515 | B1 * | 6/2006 | Thomas et al. | 711/118 |
| 7,177,919 | B1 * | 2/2007 | Truong et al. | 709/220 |
| 7,290,015 | B1 * | 10/2007 | Singhal et al. | 1/1 |
| 7,409,494 | B2 | 8/2008 | Edwards | |
| 7,433,300 | B1 * | 10/2008 | Bennett et al. | 370/216 |
| 7,590,665 | B2 * | 9/2009 | Thomas et al. | 1/1 |
| 7,676,516 | B2 * | 3/2010 | Boukobza | 707/713 |
| 7,792,885 | B2 * | 9/2010 | Piper et al. | 707/600 |
| 7,966,391 | B2 * | 6/2011 | Anderson et al. | 709/223 |
| 8,117,152 | B2 * | 2/2012 | Thomas et al. | 707/609 |
| 2002/0097724 | A1 * | 7/2002 | Halme et al. | 370/392 |
| 2002/0133594 | A1 * | 9/2002 | Syvanne | 709/226 |
| 2004/0117369 | A1 * | 6/2004 | Mandal et al. | 707/8 |
| 2004/0153863 | A1 * | 8/2004 | Klotz et al. | 714/45 |
| 2005/0267928 | A1 * | 12/2005 | Anderson et al. | 709/200 |
| 2005/0278383 | A1 * | 12/2005 | Kazar et al. | 707/200 |
| 2006/0085418 | A1 * | 4/2006 | Piper et al. | 707/8 |
| 2006/0161707 | A1 * | 7/2006 | Davies et al. | 710/268 |
| 2006/0167883 | A1 * | 7/2006 | Boukobza | 707/10 |
| 2008/0228852 | A1 * | 9/2008 | Husa et al. | 709/201 |

* cited by examiner

*Primary Examiner* — Ashok Patel
*Assistant Examiner* — Linglan Edwards
(74) *Attorney, Agent, or Firm* — Cesari and McKenna, LLP (57) ABSTRACT

A cluster of nodes share configuration data that characterizes the cluster as an entity (virtualization) to a client. Management configuration data, VSC, is entered into a replicating database, RDB. That data is distributed and stored into replicating databases in each node, and then reconciled with the corresponding cluster configuration data in dynamic memory. The dynamic memory is accessed by clients. In a preferred embodiment, the nodes are storage servers.

15 Claims, 5 Drawing Sheets

GENERIC RESYNCHRONIZATION BETWEEN PERSISTENT MANAGEMENT STORE AND DYNAMIC CONFIGURATION

BACKGROUND OF THE INVENTION

1. Field of the Invention

The present invention relates to a cluster of networked nodes comprising storage systems, and more particularly to configuration data common to and shared by the cluster of storage systems.

2. Background of the Invention

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures, or storage servers, including, but not limited to, a NAS (network-attached storage) environment, an SAN (storage area network) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume," each logical volume may be, although not necessarily, associated with its own file system. The data structures may also be viewed as objects and classes of objects, tables, address structures, and other such structures that may be used in the configuration of the systems.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

An NAS system of nodes may be clustered to respond to a client request as a single entity. As used herein, a node is a storage system embodied as a filer that may be configured to operate according to a client/server model of information delivery to thereby allow many clients to access shared resources, such as files, stored on the filer. Sharing of files is a hallmark of an NAS system that is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the TCP/IP (Transmission Control Protocol/Internet Protocol). In addition, each filer in the cluster may communicates exclusively with all the other clustered filers via a network, such as the Internet.

In a client/server model, the client may comprise an application executing on a computer that communicates with the clustered filers over a computer network, such as a point-to-point link, shared local area network, wide area network or virtual private network implemented over a public network, such as the Internet. NAS systems generally utilize file-based access protocols; therefore, each client may request the services of the clustered filers by issuing file system protocol messages (in the form of packets) to the file system over the network identifying one or more files to be accessed without regard to specific locations, e.g., blocks, in which the data are stored on disk.

The following descriptions are with respect to an NAS cluster of filers communicating via an Ethernet and a network switch, but other networked filers may be clustered via FC (Fibre Channel) or an Ethernet adapted to operate as networks. Such protocols and systems are known to those skilled in the art.

In such a cluster there is a significant amount of configuration data associated with the cluster as a whole. This configuration data is "owned" by the cluster as a single entity or an SSI (single entity image). For example, the location of an operating system domain server of a DNS (Domain Name Server) is an example of cluster configuration data. Such data is referred to herein as VSC (Virtual Server Configuration) data. The terms VSC data, configuration data and persistent configuration data may be used interchangeably herein.

There is a need to maintain a persistent set of VSC data in each of the clustered filers or nodes wherein each node has an up-deto-date common copy of the persistent VSC data. This persistent data represents data common to the cluster that, generally, does not change. For example, the common data may be class data, such as a name server class for a number of different servers. Such information may be arranged as a table (class Name Server) with row entries that represent cluster locations of specific name servers. Further, that up-to-date persistent data must be reconciled with "in core" or dynamic memory data. The "in core" data is that data in memory that is accessed by, for example, a request from a client. The persistent data and the "in-core" data are arranged so that any client interacting with the cluster receives information that is up-to-date and independent of which node or nodes in the cluster are active.

An issue is presented in such clustered systems where an administrator may make a change to VSC data in the persistent database. The change must be delivered to each node in the cluster, and each node in the cluster must reconcile or route the changed data to the corresponding "in-core," or dynamic memory. Note the change herein represent a wide definition to include, at least, modifying existing data, adding new data and/or deleting existing data.

SUMMARY OF THE INVENTION

The present invention provides a resynchronizing process for a network of clustered nodes. The resynchronizing process reconciles data in dynamic memory within each clustered node with management configuration data for the cluster that is held in a persistent RDB (Replicating DataBase) local to each of the clustered nodes. Management configuration data may be installed by an administrator into the local RDB in one of the clustered nodes whereupon it is distributed and stored into the RDBs in all the other nodes in the cluster. The dynamic memory data or contents in each node are reconciled or resynchronized with the corresponding management configuration data in the local RDB. That is, the dynamic memory data are processed to match that of the management configuration data by adding, removing or modifying the dynamic memory data in each node. These operations are, illustratively, accomplished with a resynchronizing algorithm.

Herein the terms "resynchronizing," and "reconciling," may be used interchangeably.

The cluster of nodes, for example filers, preferably share a common network address so that clients interact with the cluster as if the cluster were a single node or storage server. The filers themselves communicate exclusively with each other using either a broadcast address or by having the addresses of the individual filers. The network is preferably Ethernet connected filers/nodes sharing a network switch to other geographically separated nodes on the same cluster.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention, as detailed below, includes a resynchronization process that reconciles data in dynamic memory within each node of a cluster with management configuration data for the cluster held in a persistent RDB within the management module in each node in the cluster.

A. Cluster Environment

Figure 1:
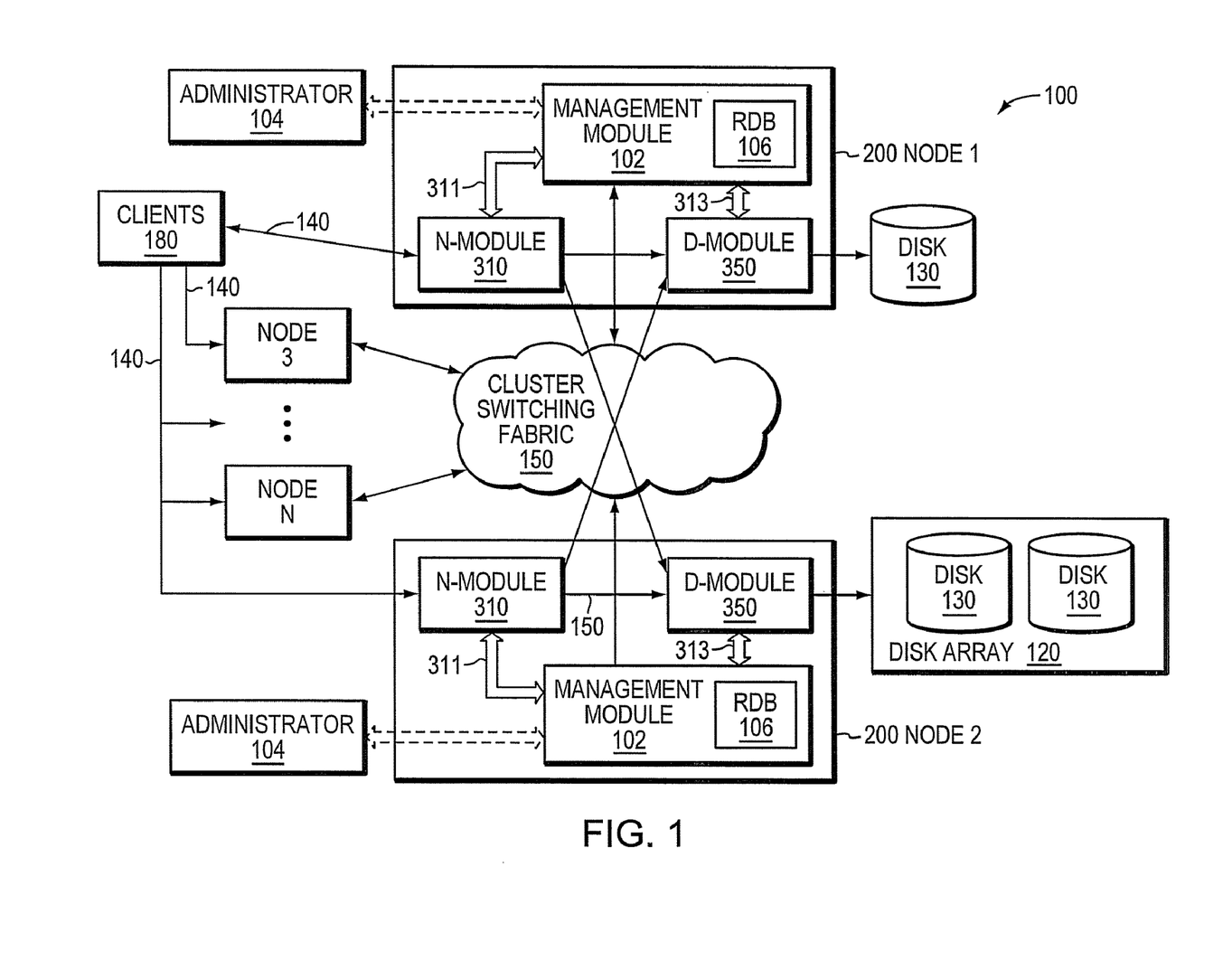
FIG. 1 is a schematic block diagram of a plurality of nodes interconnected as a cluster in accordance with an embodiment of the present invention.

FIG. 1 is a schematic block diagram of a plurality of nodes 1-$n$ interconnected as a cluster 100 and configured to provide storage services relating to the organization of information on storage devices. The nodes 1 through n comprise various functional components that cooperate to provide a distributed storage system architecture of the cluster 100 that reacts to a client inquiry as if it were a single entity. To that end, each node is generally organized as shown in nodes 1 and 2, items 200, with a network element (N-module 310), a disk element (D-module 350) and a management module 102. The management module 102 generally provides, among other processes, an entry for an administrator to manage the cluster.

The N-module 310 includes functionality that enables the nodes to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 entitled, METHOD AND SYSTEM FOR RESPONDING TO FILE SYSTEM REQUESTS, by M. Kazar et al. published Aug. 22, 2002. This application/publication is incorporated herein by reference. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node comprising one N-module and one D-module should be taken as illustrative only. The management module 102 and RDB (Replicated DataBase) 106, described below, exist in all nodes participating in the cluster. However, a GUI and corresponding physical connection in one or more nodes allows an administrator 104 access to the cluster Clients 180 may be general-purpose computers configured to interact with the clustered nodes 100 in accordance with a client/server model of information delivery.

That is, each client may request the services of the cluster, and one or more nodes in the cluster may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
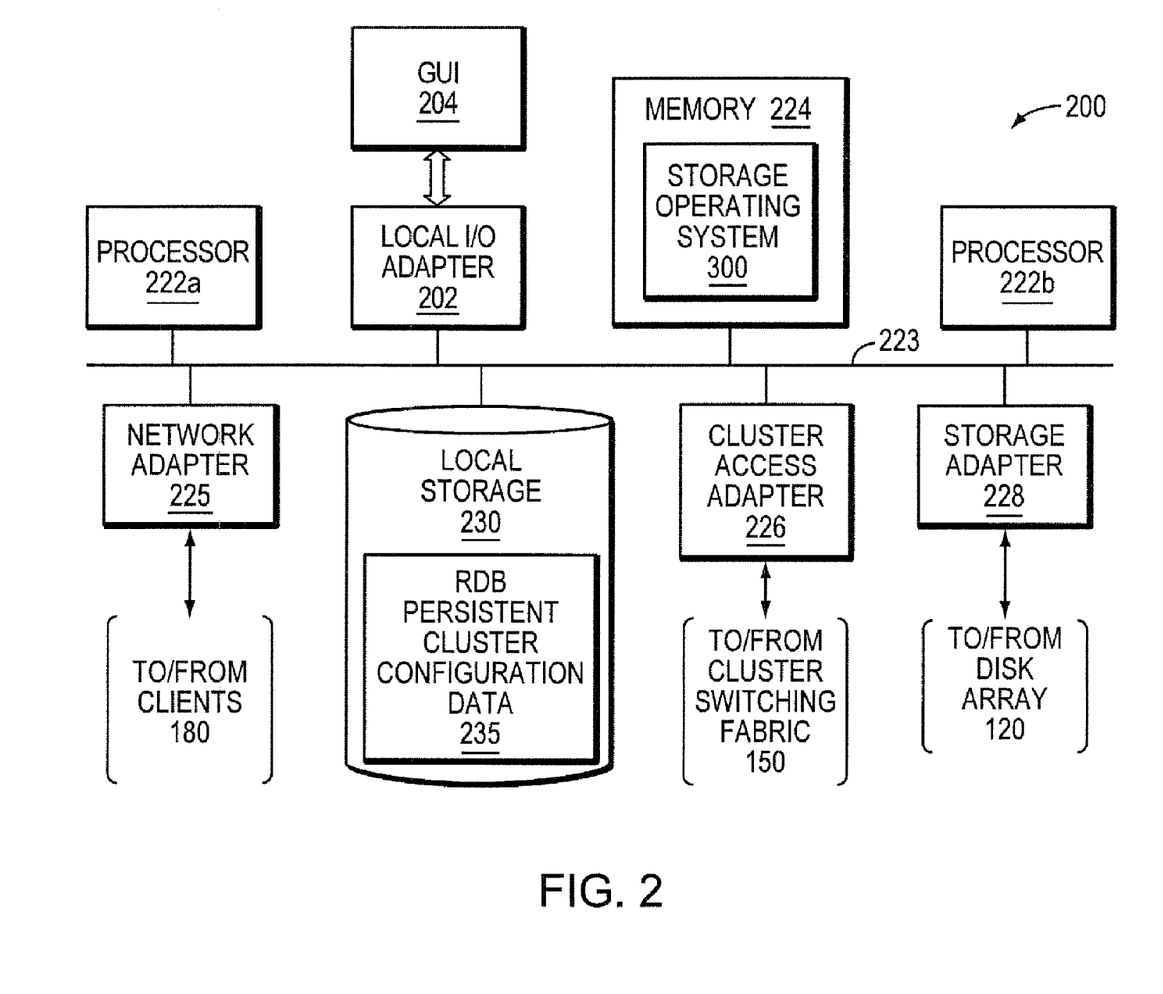
FIG. 2 is a schematic block diagram of a node in accordance with an embodiment of the present invention.

FIG. 2 is a schematic block diagram of a node 200 that is illustratively embodied as a storage system comprising a plurality of processors 222a, 222b, a memory 224, a network adapter 225, a cluster access adapter 226, a local I/O adapter 202 coupled to a GUI 204, a storage adapter 228 and local storage 230 interconnected by a system bus 223. The local storage 230 comprises one or more storage devices, such as disks, utilized by the node to locally store configuration information (e.g., in configuration table 235) provided by one or more management modules 102. The management module typically executes as user mode applications. The locally stored configuration information includes persistent cluster configuration data stored in the RDB 106. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternative embodiments where the N-modules and D-modules are implemented on separate storage systems or computers, the cluster access adapter 226 is utilized by the N/D-module for communicating with other N/D-modules in the cluster 100, and by the management module 102 for communicating with the management modules in the other nodes in the cluster.

Local I/O adapter 202 couples the system bus 223 to external hardware may be used for direct input/output to a particular node. In one case an administrator may use the GUI 204 to input cluster configuration data into the node 200, whereupon that data is then directed to the cluster itself as described below.

Each node 200 is illustratively embodied as a dual processor storage system execs cuting a storage operating system 300 that preferably implements a high-level module, such as a filer, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350. The functions of the management module may be implemented in a third processor or shared between two processors or within one of the two processors.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

Figure 3:
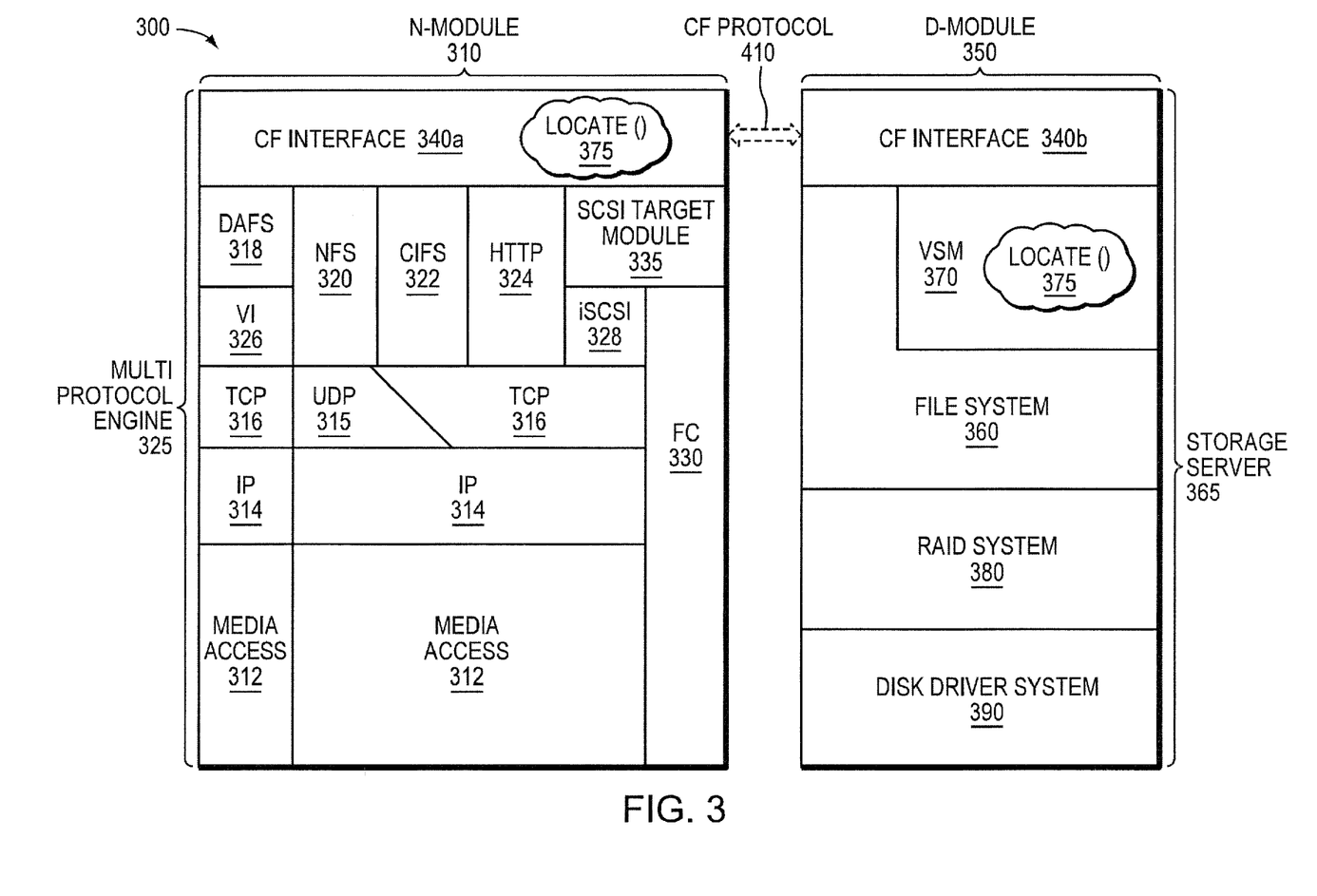
FIG. 3 is a schematic block diagram of a storage operating system that may be used with the present invention.

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSIspecific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) of the present invention. As described further herein, the VSM cooperates with the file system 360 to enable storage server 365 to service a volume of the SVS. In particular, the VSM 370 implements the novel Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as minoring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path," through the storage operating system layers described above needed to perform data storage access for the client request received at the node, may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intra-cluster communication among the modules, including D-module-to-D-module communication for data container striping operations described herein.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

The following portion of this preferred embodiment is primarily directly to the management aspects of the systems discussed. More information or the N-Module and D-Module may be found in the above incorporated by reference document.

E. VLDB

Figure 4:
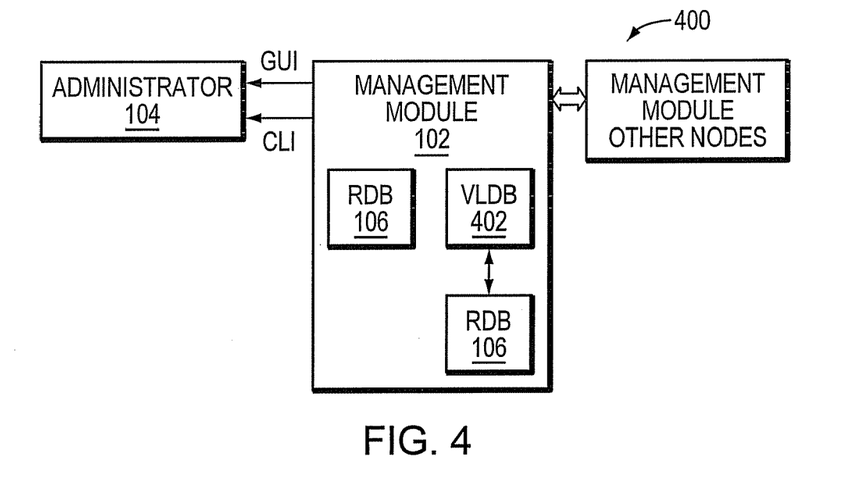
FIG. 4 is a schematic block diagram of a collection of management processes that may be used with the present invention.

FIG. 4 is a schematic block diagram illustrating a collection of management processes 400 that execute as user mode applications on the storage operating system 300 to provide management of configuration information (i.e. management data) for the clustered nodes. To that end, the management processes include a management module 102 and a volume location database (VLDB) process 402, each utilizing a data replication service (RDB 106) linked, for example, as a library. The management processes provide an administrator 104 interface via a command line interface (CLI) and/or a web-based graphical user interface (GUI). The management module may be based on a number of interface managers that provide the entity with which users/system administrators interact with a node 200 in order to manage the cluster 100.

The VLDB 402 is a database process that tracks the locations of various storage components (e.g., SVSs, flexible volumes, aggregates, etc.) within the cluster 100 to thereby facilitate routing of requests throughout the cluster. More detail on these storage components can be found in U.S. patent application Ser. No. 10/836,817, entitled: EXTENSION OF WRITE ANYWHERE FILE SYSTEM LAYOUT, to John K. Edward et al., and assigned to Network Appliance, Inc. This application is hereby incorporated herein by reference. In the illustrative embodiment, each node accesses a configuration table 235 that maps the location of stored components used to service requests within the cluster. The VLDB includes a plurality of entries which, in turn, provide the contents of entries in the configuration table; among other things, these VLDB entries keep track of these locations. The VLDB has a remote procedure call (RPC) interface, e.g., a Sun RPC interface, which allows, for example, the N-module 110 to query the VLDB 402.

Figure 5:
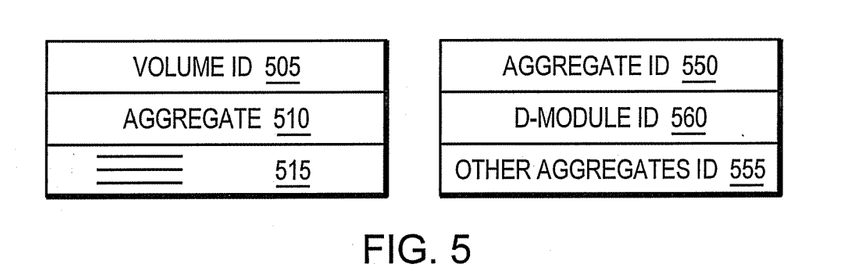
FIG. 5 is a block diagram of the volume location database (VLDB) and aggregate entry in accordance with the present invention.

FIG. 5 is a schematic block diagram of an exemplary VLDB volume entry 500 and aggregate entry 550. The entry 500 includes a volume ID field 505, an aggregate ID field 510 and, in alternative embodiments, additional fields 515. The volume ID field 505 contains an ID that identifies a volume used in a volume location process. The aggregate ID field 510 identifies an aggregate containing the volume identified by the volume ID in the cluster and a D-module field 560. The D-module field 560 contains an ID of a D-module host for the aggregate identified in the field 555.

Referring back to FIG. 1 the management processes have interfaces to (and are closely coupled to) RDBs 106. The RDB may comprise a library that provides a persistent object store (storing of objects) for the management data processed by the management processes. Notably, the RDBs 106 replicates and synchronizes the management data object store access across all nodes 200 of the cluster 100 to thereby ensure that the RDB database image is identical on all of the nodes 200. The primary communication channel is RDB to RDB over TCP. At system startup, each node 200 records the status/state of its interfaces and IP addresses (those IP addresses it "owns") into the RDB database.

In an illustration of the invention, the management configuration data accessible by all the nodes in a cluster is referred to a VSC (Virtual Server Configuration). The VSC 856 resides in the RDB 106 and is maintained among all the clustered nodes or filers in order for a client to interface as if the cluster were a logical entity.

Figure 6:
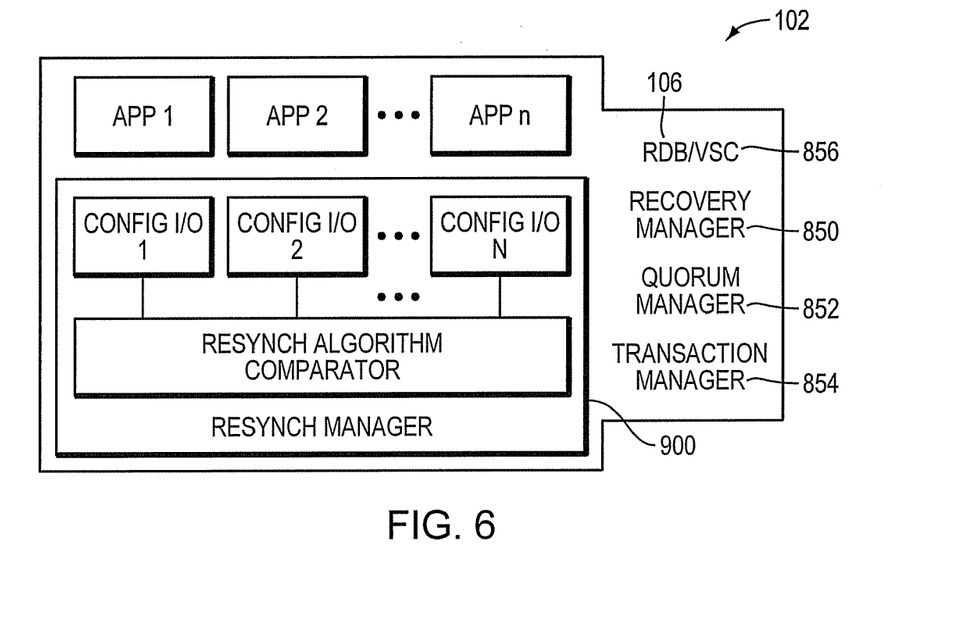
FIG. 6 is a schematic block diagram illustrating a resynchronizing manager operating in accordance with the present invention.

FIG. 6 is a schematic block diagram illustrating a management module 102 cooperating with RDB 106 in accordance with the present invention. The management module 102 includes a RESYCN manager 900 while the RDB may contain a number of components, for example, a recovery manager 850, a quorum manager 852 and a transaction manager 854.

The recovery manager 850 oversees a distributed recovery mechanism of the RDB, and is responsible for synchronizing databases as nodes come into quorum. The recovery manager interfaces with the quorum manager 852 and transaction manager 854. The quorum manager 852 manages quorum voting, by tracking participating nodes, and responds to heartbeat signals, for example, to ensure that the cluster is in quorum. Should the cluster and/or individual nodes fall in or out of quorum, the quorum manager 852 alerts the recover manager 854. The transaction manager 854 processes all RDB transactions, propagating them to remote in-quorum nodes, and ensuring that each is performed atomically (all or none).

Assume that newly up-dated persistent cluster configuration data, such as VSC 856 data is distributed to and stored in the RDB in a node in the cluster. Note, this new data (VSC) has been distributed to all the RDB's in all the nodes in the cluster. That up-dated data is then copied from the RDB to the appropriate final dynamic memory destination in the node, a running application, e.g., App1, or the location of a file, App2, accessible by a client. For example, if a name server's location has been changed by an administrator, that new location is loaded into the RDB in each node. Then, the application, referencing the name server, is updated with the new location. Referencing back to FIG. 1 the communications channels 311 and 313 are used by the management module 102 for updating dynamic memory that might exist in the N-Module or the D-Module, or, for that matter, anywhere in a node.

The final dynamic memory destinations (App1 through Appn) may include a process's address space, a local file on a file system, an event sequence start, the location of a server, or other locations that may be used to store cluster configuration data.

F. Resynchronizing Flow chart

Figure 7:
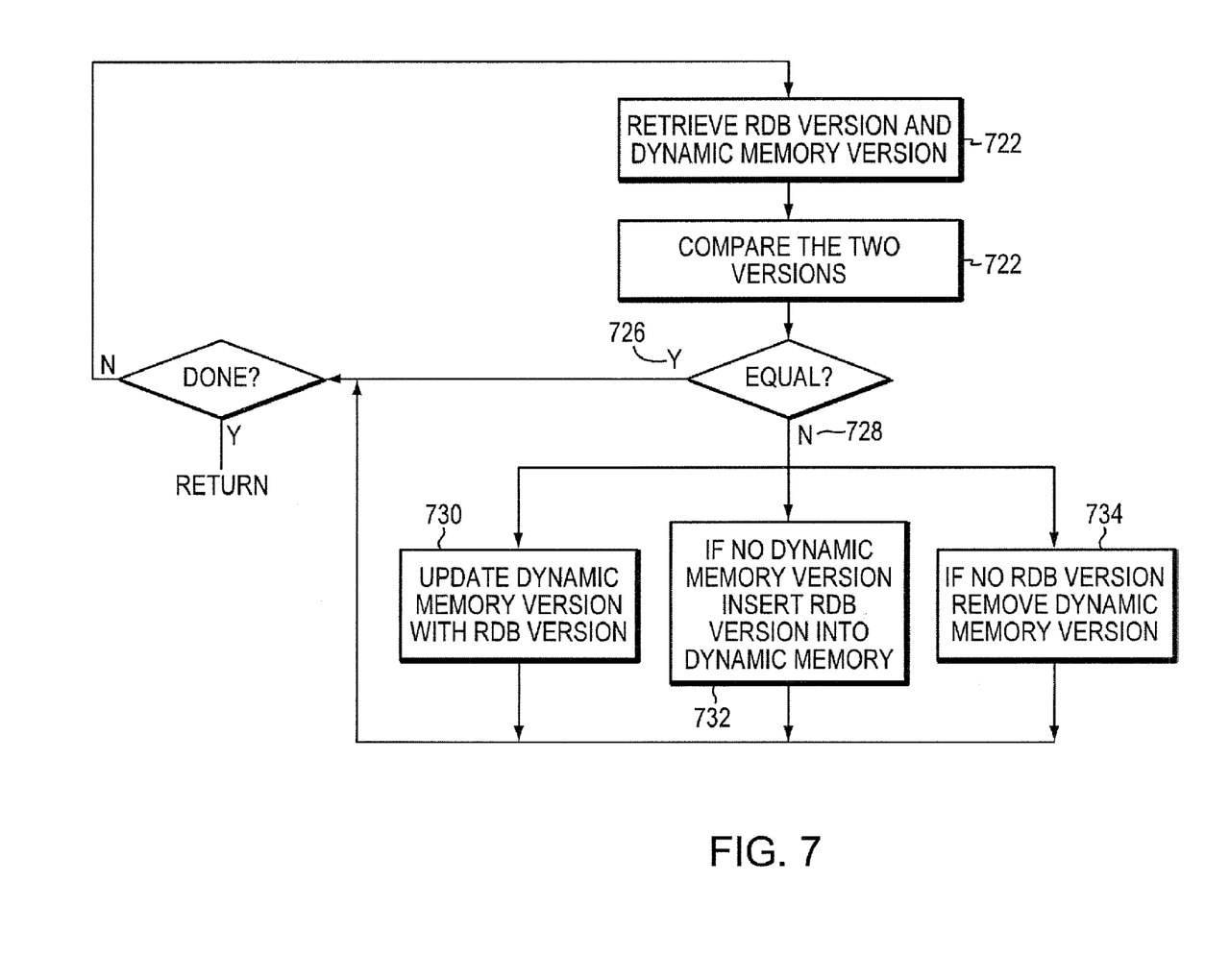
FIG. 7 is a flow chart illustrating resynchronization that may be used with the present invention.

A resynchronization process flow chart is illustrated in FIG. 7. the process accomplishes the task of updating the applications within each node. As noted, the RDB stores persistent cluster configuration data (VSC) within each of the clustered nodes. That VSC data in the RDB must be reconciled (via read/writes, removal by the resynchronization algorithm) with the corresponding data in the "in core" or dynamic memory available to clients or other users. Typically the data is related in a hierarchy and the VSC refers to an entire database. A class within the VSC would be, for example, a table in that database, and an instance would be, for example, a row in that table.

If there is a failure to the VSC data associated with a particular protocol, that protocol is not enabled. In such an instance, the algorithm tracks the operations at the sinks, e.g., commands that modify, remove or add instances to the dynamic memory locations. If any of these operations fail, the client application or protocol using that failed configuration is disabled. The VSC may only enable those protocols that have not experienced a failed reconciliation.

When VSC is added to or changed, the administrator or developer may make changes, for example, a new table may be created. When these changes are loaded into the RDB, reads the data from the dynamic memory and the RDB, and then operates on the data to add, remove or modify the data in the dynamic memory so that the dynamic memory contents matches that in the RDB. The RDB provides a mechanism for the changed information in a node to be shared to all the nodes in the cluster, whereupon eventually each of the nodes reconciles the data within their dynamic memories with respect to the newly entered VSC information.

The trigger for each node to reconcile its RDB contents with that in its dynamic memory may be any number of events, such as, but limited to: RDB quorum change from offline to online; database update callback; an administrator request via a user interface, a timer event; and a software error that signals the reconciliation to run.

The flow chart of FIG. 7 initiates the resynchronization process by retrieving the RDB version and the dynamic memory version 722. If the two versions are compared 724 and if equal 726, the dynamic memory version is left alone and the remaining dynamic memory is examined. When there is a difference 728 the copy in dynamic memory is altered 730 to be the same as the copy in the RDB. If there no version in dynamic memory, the RDB instance is inserted into the dynamic memory 732, and for each instance in the dynamic memory that does not have a corresponding RDB version, that instance is removed 734.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A resynchronization process for a cluster of nodes interconnected over a cluster switching fabric, the resynchronization process configured to reconcile dynamic memory data in each node of the cluster with management configuration data, the resynchronization process comprising:

loading the management configuration data into a replicated database (RDB) on each node of the cluster that shares a common network address so that clients can interact with any node in the cluster, wherein each node of the cluster includes at least one of a network element and a disk element, and wherein the management configuration data is owned by the cluster of nodes as a single entity; and in response to loading the management configuration data into the RDB on each node of the cluster, resynchronizing the dynamic memory data with the management configuration data in each RDB on each node of the cluster, wherein the management configuration data is shared among each node of the cluster, and wherein the resynchronizing comprises, for each node of the cluster:

comparing the dynamic memory data in the node of the cluster with the management configuration data loaded into the RDB on the node of the cluster, and in response to the comparison, adding, removing or modifying the dynamic memory data in the node of the cluster so that the dynamic memory data replicates the management configuration data loaded into the RDB on the node of the cluster thus allowing a requesting client to access any node of the cluster to obtain an up-to-date version of the management configuration data;

detecting a failure in the resynchronizing; and disabling at least one of a client application and a protocol from using the management configuration data associated with the detected failure.

2. The process of claim 1 further comprising:

changing the management configuration data in a single node;

distributing the changed management configuration data to each other node of the cluster; and resynchronizing the dynamic memory data of all nodes of the cluster.

3. The process of claim 1 further comprising:

structuring the management configuration data in a persistent memory as classes and instantiations therein; and structuring the management configuration data in a dynamic memory in each node as corresponding classes and corresponding instantiations.

4. The process of claim 1, further comprising:

managing the cluster of nodes from any node of the cluster.

5. The process of claim 1 further comprising:

organizing the management configuration data and the dynamic memory data as objects.

6. The process of claim 1 further comprising storing new cluster configuration data into a RDB of a first node of the cluster, wherein contents of the RDB of the first node are distributed and loaded into the RDB in each other node of the cluster.

7. A system for resynchronizing dynamic memory data with management configuration data across a cluster of nodes interconnected over a cluster switching fabric, the system comprising:

a replicated database (RDB) on each node of the cluster containing the management configuration data that is owned by the cluster of nodes as a single entity, wherein each node of the cluster includes at least one of a network element and a disk element and wherein each node of the cluster shares a common network address so that clients can interact with any node in the cluster;

a dynamic memory in each node of the cluster, wherein the dynamic memory stores the dynamic memory data associated with at least one of client applications and protocols;

a comparator that compares the dynamic memory data in each node with the management configuration data in the RDB on each node;

a reconciliation processor that, in response to the comparison, adds, removes or modifies the dynamic memory data in each node of the cluster to match contents of the management configuration data in the RDB on each node of the cluster, thereby allowing a requesting client to access any node of the cluster to obtain an up-to-date version of the management configuration data;

a processor to detect a failure to replicate the dynamic memory data and the management configuration data; and a first program that disables the at least one of client applications and protocols from using the management configuration data associated with the detected failure.

8. The system of claim 7 wherein the management configuration data and the dynamic memory data are objects.

9. The system of claim 7 further comprising:

an interface where an administrator enters a change into the management configuration data in the RDB of a specific node; and a second program that distributes the change to each other node of the cluster, wherein the reconciliation processor operates in each of the nodes of the cluster to match the dynamic memory data with the management configuration data in the RDB of each of the nodes of the cluster.

10. The system of claim 7 wherein the management configuration data is held as classes and instantiations, and in the dynamic memory data has corresponding classes and corresponding instantiations therein.

11. The system of claim 7, wherein the management configuration data may be entered from any node in the cluster.

12. The system of claim 7 wherein the management configuration data and the dynamic memory data are held as objects.

13. The system of claim 7 further comprising a port in a node in the cluster, wherein the port allows new configuration data to be stored into the RDB of the node.

14. A non-transitory computer readable medium containing executable program instructions executed by a processor, comprising:

program instructions that load management configuration data into a replicated database (RDB) on each node in a cluster interconnected over a cluster switching fabric, wherein each node in the cluster includes at least one of a network element and a disk element, wherein the management configuration data is owned by the cluster as a single entity, and wherein each node in the cluster shares a common network address so that clients can interact with any node in the cluster;

program instructions that resynchronize content of a dynamic memory in each of the nodes in the cluster with the management configuration data in response to loading the management configuration data into the RDB on each node in the cluster, wherein the program instructions that resynchronize comprise:

program instructions that compare the dynamic memory content in each node in the cluster with the management configuration data loaded into the RDB on each node in the cluster;

in response to the comparison, program instructions that add, remove or modify the dynamic memory content in each node in the cluster so that the dynamic memory replicates the management configuration data loaded into the RDB on each node in the cluster, thus allowing a requesting client to access any node of the cluster to obtain an up-to-date version of the management configuration data;

program instructions that detect a failure in the resynchronizing; and program instructions that disable at least one of a client application and a protocol from using the management configuration data associated with the detected failure.

15. A method, comprising:

maintaining a plurality of nodes interconnected as a cluster over a cluster switching fabric, wherein each node in the cluster includes at least one of a network element and a disk element, and shares a common network address so that a client can interact with any node in the cluster;

loading management configuration data into a replicated database (RDB) on each node of the cluster, wherein the management configuration data is owned by the plurality of nodes interconnected as the cluster as a single entity;

in response to loading the management configuration data into the RDB on each node of the cluster, comparing contents of a dynamic memory in each node with the management configuration data loaded into the RDB on that same node;

in response to the comparison indicating that no data is located in the contents of the dynamic memory, adding the management configuration data loaded into the RDB to the dynamic memory;

in response to the comparison resulting in no difference between the contents of the dynamic memory and the management configuration data loaded into the RDB of the node, leaving the contents of the dynamic memory as is;

in response to the comparison resulting in a difference between the contents of the dynamic memory and the management configuration data loaded into the RDB of the node, modifying the contents of the dynamic memory to be the same as the management configuration data loaded into the RDB of the node, thus allowing a requesting client to access any node of the plurality of nodes interconnected as the cluster to obtain an up-to-date version of the management configuration data;

detecting a failure in the desynchronizing; and disabling at least one of a client application and a protocol from using the management configuration data associated with the detected failure.

* * * * *

UNITED STATES PATENT AND TRADEMARK OFFICE
CERTIFICATE OF CORRECTION

| | | |
|---|---|---|
| PATENT NO. | : 8,332,497 B1 | Page 1 of 1 |
| APPLICATION NO. | : 11/676894 | |
| DATED | : December 11, 2012 | |
| INVENTOR(S) | : Jacob Gladish et al. | |

It is certified that error appears in the above-identified patent and that said Letters Patent is hereby corrected as shown below:

In the Specifications:

Col. 1, line 55 should read: "data is ~~is~~ substantially contiguously arranged on disks. The"

Col. 2, line 41 should read: "up-~~de~~to-date common copy of the persistant VSC data. This"

Col. 5, line 25 should read: "sor storage system ~~exces cuting~~executing a storage operating system"

Col. 7, line 57 should read: "~~minoring~~mirroring and/or parity (RAID). The file system 360 illustra-"

In the Claims:

Col. 12, line 55 should read: "single entity;~~ and~~"

Col. 16, line 10 should read: "detecting a failure in the ~~desynchronizing~~resynchronizing; and"

Signed and Sealed this
Fourteenth Day of May, 2013

Teresa Stanek Rea
*Acting Director of the United States Patent and Trademark Office*